(12) United States Patent
Hayes et al.

(10) Patent No.: US 10,252,788 B2
(45) Date of Patent: *Apr. 9, 2019

(54) SYSTEMS AND METHODS FOR CONFIGURABLE USER INTERFACES

(71) Applicant: Insitu, Inc., Bingen, WA (US)

(72) Inventors: Andrew Royds Hayes, White Salmon, WA (US); Darcy Lynn Davidson, Jr., Dallesport, WA (US)

(73) Assignee: THE BOEING COMPANY, Chicago, IL (US)

( * ) Notice: Subject to any disclaimer, the term of this patent is extended or adjusted under 35 U.S.C. 154(b) by 22 days.

This patent is subject to a terminal disclaimer.

(21) Appl. No.: 15/620,646

(22) Filed: Jun. 12, 2017

(65) Prior Publication Data

US 2017/0305535 A1 Oct. 26, 2017

Related U.S. Application Data

(63) Continuation of application No. 14/453,364, filed on Aug. 6, 2014, now Pat. No. 9,676,472.

(Continued)

(51) Int. Cl.
*B64C 19/00* (2006.01)
*B64C 39/00* (2006.01)
*G05D 1/00* (2006.01)

(52) U.S. Cl.
CPC .............. *B64C 19/00* (2013.01); *B64C 39/00* (2013.01); *G05D 1/0016* (2013.01)

(58) Field of Classification Search
CPC . B64C 39/024; B64C 19/00; B64C 2201/127; B64C 2201/146; B64C 2201/141; B64C 2201/021; B64C 2201/027; B64C 2201/042; B64C 2201/104; B64C 2201/121; B64C 2201/201; B64C 2201/203; B64C 2201/208; B64C 39/028; G05D 1/0088; G05D 1/101; G05D 1/0038; G05D 1/0094; G05D 1/0022; G05D 1/0016; G05D 1/0044; G05D 1/0676; G05D 1/0061; G05D 1/104; G05D 1/105; G05D 1/0011; G05D 1/0202; G05D 2201/0209; G08G 5/0069; G08G 5/0013; G08G 5/0026; G08G 5/0082;

(Continued)

(56) References Cited

U.S. PATENT DOCUMENTS 5,716,032 A * 2/1998 McIngvale ............ B64C 39/024
244/185
6,377,875 B1 * 4/2002 Schwaerzler ......... B64C 39/024
244/1 R

(Continued)

*Primary Examiner* — Anne M Antonucci
*Assistant Examiner* — Sanjeev Malhotra
(74) *Attorney, Agent, or Firm* — Gates & Cooper LLP (57) ABSTRACT

A user interface presented to an operator of an unmanned aerial vehicle (UAV) may be presented to facilitate the ease of operation of the UAV. The information displayed in the user interface may be customized by the operator to display selected data. The display configuration data may be saved and imported into other systems for future use. Various entities related to one or more UAVs may be presented in a hierarchical tree structure illustrating the relationship between the entities. Electronic checklists may be presented to a user to facilitate addressing common and emergency situations.

20 Claims, 10 Drawing Sheets

Related U.S. Application Data (60) Provisional application No. 61/872,448, filed on Aug. 30, 2013.

(58) Field of Classification Search
CPC ...... G08G 5/0008; G08G 5/0039; G08G 5/04; G08G 5/045; G01C 21/00; G01C 23/005; G01S 13/003; G01S 13/86; G01S 13/91; G01S 7/003
USPC ........ 701/2, 4, 9, 11, 13, 15, 16, 18, 23, 24, 701/25, 117, 120, 301; 703/2; 356/237.2; 244/1 R, 63, 75.1, 76 R, 120, 244/158.4, 175, 185, 189, 190; 345/601; 342/357.2; 340/903, 963, 991; 180/402; 1/1
See application file for complete search history.

(56) References Cited

U.S. PATENT DOCUMENTS

| | | | |
|---|---|---|---|
| 6,873,886 B1 * | 3/2005 | Mullen | B64G 1/24 701/2 |
| 7,454,255 B1 * | 11/2008 | Boskovic | G05B 9/03 180/402 |
| 7,693,617 B2 | 4/2010 | Dockter | B63B 35/50 244/158.4 |
| 7,706,979 B1 * | 4/2010 | Herwitz | G01S 13/003 701/301 |
| 7,778,744 B2 | 8/2010 | Rath | G05D 1/101 244/120 |
| 7,962,252 B2 * | 6/2011 | Shams | G05D 1/101 345/601 |
| 7,970,500 B2 | 6/2011 | Parra Carque | G01C 3/08 342/357.2 |
| 8,370,057 B1 * | 2/2013 | Herwitz | G01S 13/003 340/903 |
| 8,457,809 B2 | 6/2013 | Lee | G05D 1/0016 244/190 |
| 8,515,609 B2 | 8/2013 | McAndrew | G05D 1/0038 244/76 R |
| 8,594,932 B2 * | 11/2013 | McIver | G01C 23/00 701/117 |
| 8,626,361 B2 | 1/2014 | Gerlock | G08G 5/0013 340/991 |
| 8,639,396 B1 * | 1/2014 | Hirsch | G08G 5/0008 244/76 R |
| 8,755,950 B2 | 6/2014 | Johansson | G05D 1/0022 340/963 |
| 8,755,965 B1 * | 6/2014 | McClintic | G05D 1/0016 701/23 |
| 8,761,964 B2 | 6/2014 | Lee | B64C 19/00 244/189 |
| 8,886,368 B2 * | 11/2014 | Muren | G05D 1/0016 244/175 |
| 8,914,182 B2 * | 12/2014 | Casado | G05D 1/0088 701/24 |
| 8,954,206 B2 * | 2/2015 | Criado | G05D 1/105 701/4 |
| 8,965,598 B2 * | 2/2015 | Kruglick | B64C 39/024 244/75.1 |
| 2003/0212478 A1 * | 11/2003 | Rios | G05D 1/0044 701/2 |
| 2004/0193334 A1 * | 9/2004 | Carlsson | G05D 1/0022 701/9 |
| 2005/0004723 A1 * | 1/2005 | Duggan | G05D 1/0061 701/24 |
| 2006/0058928 A1 * | 3/2006 | Beard | G01C 23/005 701/11 |
| 2006/0074557 A1 * | 4/2006 | Mulligan | G05D 1/0094 701/13 |
| 2006/0271251 A1 * | 11/2006 | Hopkins | A63H 30/04 701/23 |
| 2008/0033604 A1 * | 2/2008 | Margolin | G05D 1/0044 701/2 |
| 2008/0167763 A1 * | 7/2008 | Duranti | G05D 1/105 701/11 |
| 2009/0055347 A1 * | 2/2009 | Hollman | G06Q 30/08 |
| 2009/0112387 A1 * | 4/2009 | Kabalkin | G05D 1/0038 701/23 |
| 2009/0112388 A1 * | 4/2009 | Yeager | G09B 9/00 701/23 |
| 2009/0212157 A1 * | 8/2009 | Arlton | B64C 27/10 244/63 |
| 2009/0306840 A1 * | 12/2009 | Blenkhorn | G05D 1/0676 701/16 |
| 2009/0326792 A1 * | 12/2009 | McGrath | G01W 1/08 701/120 |
| 2010/0168949 A1 * | 7/2010 | Malecki | G05D 1/0676 701/24 |
| 2010/0228418 A1 * | 9/2010 | Whitlow | G11B 27/105 701/25 |
| 2010/0286859 A1 * | 11/2010 | Feigh | G05D 1/0044 701/25 |
| 2011/0144828 A1 * | 6/2011 | Chengalva | F41H 7/005 701/2 |
| 2011/0147515 A1 * | 6/2011 | Miller | B64C 39/028 244/63 |
| 2011/0246015 A1 * | 10/2011 | Cummings | G06F 3/04815 701/23 |
| 2011/0264311 A1 * | 10/2011 | Lee | H04N 7/183 701/15 |
| 2011/0295569 A1 * | 12/2011 | Hamke | G01P 5/00 703/2 |
| 2012/0173045 A1 * | 7/2012 | Conroy | F41H 5/06 701/2 |
| 2012/0209457 A1 * | 8/2012 | Bushnell | G01C 21/00 701/13 |
| 2012/0262708 A1 * | 10/2012 | Connolly | B64C 39/024 356/237.2 |
| 2013/0325222 A1 * | 12/2013 | Roh | B64C 39/024 701/18 |
| 2014/0249693 A1 * | 9/2014 | Stark | B64C 39/024 701/2 |

* cited by examiner

SYSTEMS AND METHODS FOR CONFIGURABLE USER INTERFACES

CROSS-REFERENCE TO RELATED APPLICATIONS

This application is a continuation of U.S. patent application Ser. No. 14/453,364, entitled "SYSTEMS AND METHODS FOR CONFIGURABLE USER INTERFACES," by Royds Hayes, et al, filed Aug. 6, 2014, now issued as U.S. Pat. No. 9,676,472, which application claims priority to U.S. Provisional Patent Application No. 61/872,448, entitled "SYSTEMS AND METHODS FOR CONFIGURABLE USER INTERFACES," by Royds Hayes, et al, filed Aug. 30, 2013, both of which applications are hereby incorporated by reference.

BACKGROUND

Unmanned aerial vehicles (UAVs) are aircraft with no human pilot onboard that are often operated with assistance from ground-based personnel and/or systems. The use of UAVs has been increasing as the need for such aircraft grows and advances in UAV technology make UAVs more capable and less expensive. Applications of UAVs include use both military applications and civilian applications such as policing, firefighting, and surveillance. UAVs are typically operated by ground-based personnel using systems that include a software interface allowing operators to control and monitor one or more UAVs. Operating a UAV may require an operator to consider many factors that may change at any time, including constantly changing environmental and operational conditions. Therefore, it is essential that the user interface to a system for control and monitoring of a UAV be as user-friendly and accessible as possible.

SUMMARY

Illustrative examples of the subject matter set forth herein include, without limitation, a method, device, and computer-readable storage medium. In one aspect, user interfaces presented to an operator of a UAV may be presented to facilitate the ease of operation of the UAV by using window and panel attributes that increase ease of use, including window docking, tabbing, and customized user interface display configurations. Display configuration data may be saved for future use. Such display configuration data may also be imported into other systems or exported for use elsewhere. A hierarchical tree structure may be presented to an operator clearly showing the various entities related to one or more UAVs and illustrating the relationship between the entities. Electronic checklists may be presented to a user to facilitate addressing common and emergency situations. Upon selection of elements within a checklist, more detailed information may be presented to an operator. Controls and data inputs may also be presented to an operator so that the operator can obtain refined instructions based on input data and perform functions specific to the selected step.

The features, functions, and advantages that have been discussed can be achieved independently in various implementations or may be combined in yet other implementations further details of which can be seen with reference to the following description and drawings.

BRIEF DESCRIPTION OF THE DRAWINGS

Examples of techniques in accordance with the present disclosure are described in detail below with reference to the following illustrations.

DETAILED DESCRIPTION

Figure 1:
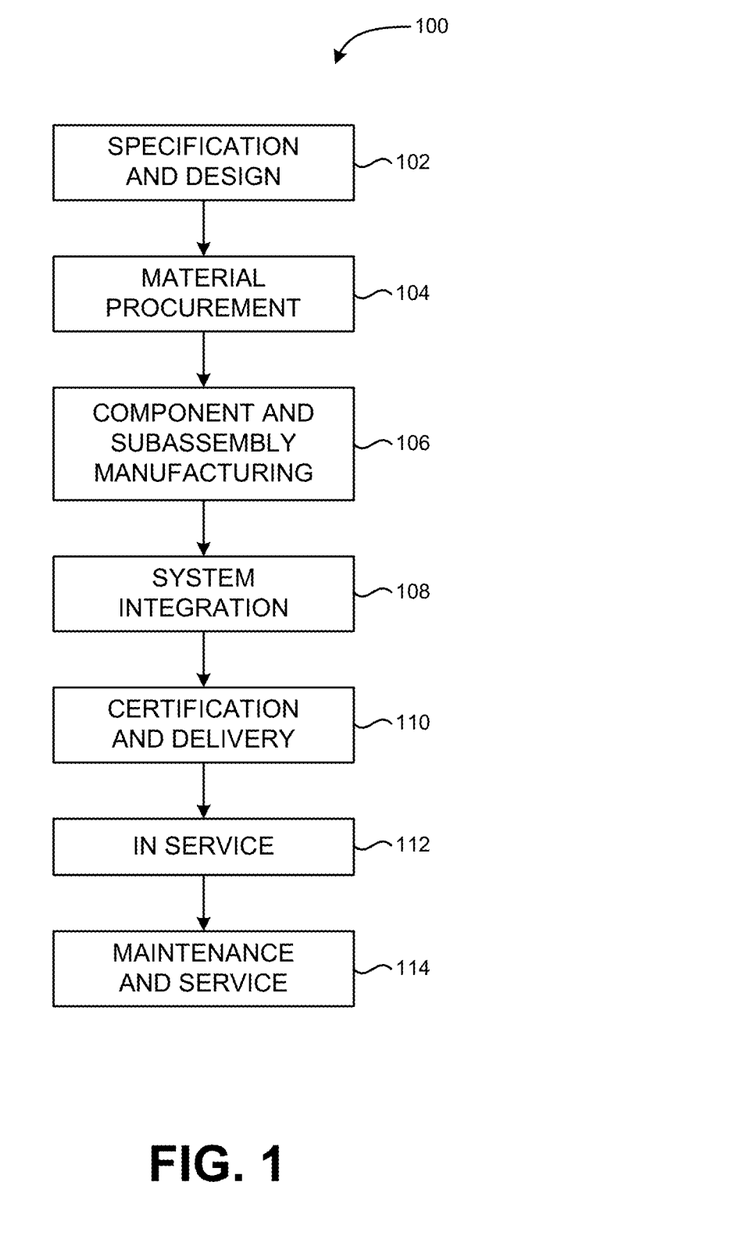
FIG. 1 depicts a flow diagram of an aircraft production and service methodology.
Figure 2:
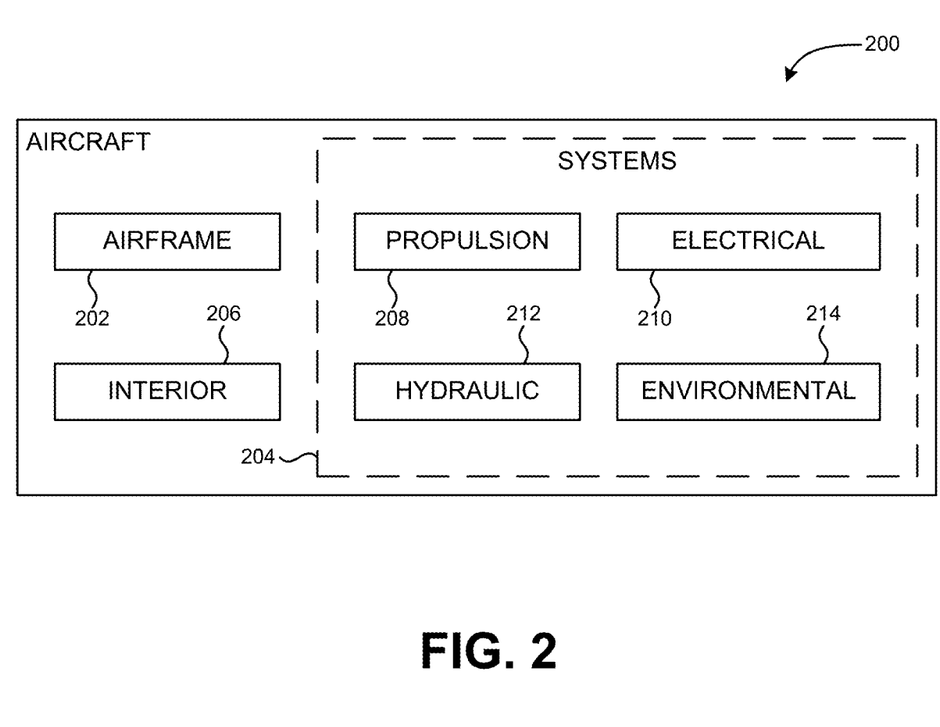
FIG. 2 depicts a block diagram of an aircraft.

Examples in this disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 may take place. Thereafter, aircraft 200 may go through certification and delivery 110 in order to be placed in service 112. While in service by a customer, aircraft 200 may be scheduled for routine maintenance and service 114, which may also include modification, reconfiguration, refurbishment, and so on.

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors. A third party may include, for example and without limitation, any number of venders, subcontractors, and suppliers. An operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus, systems, and methods disclosed herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Figure 3:
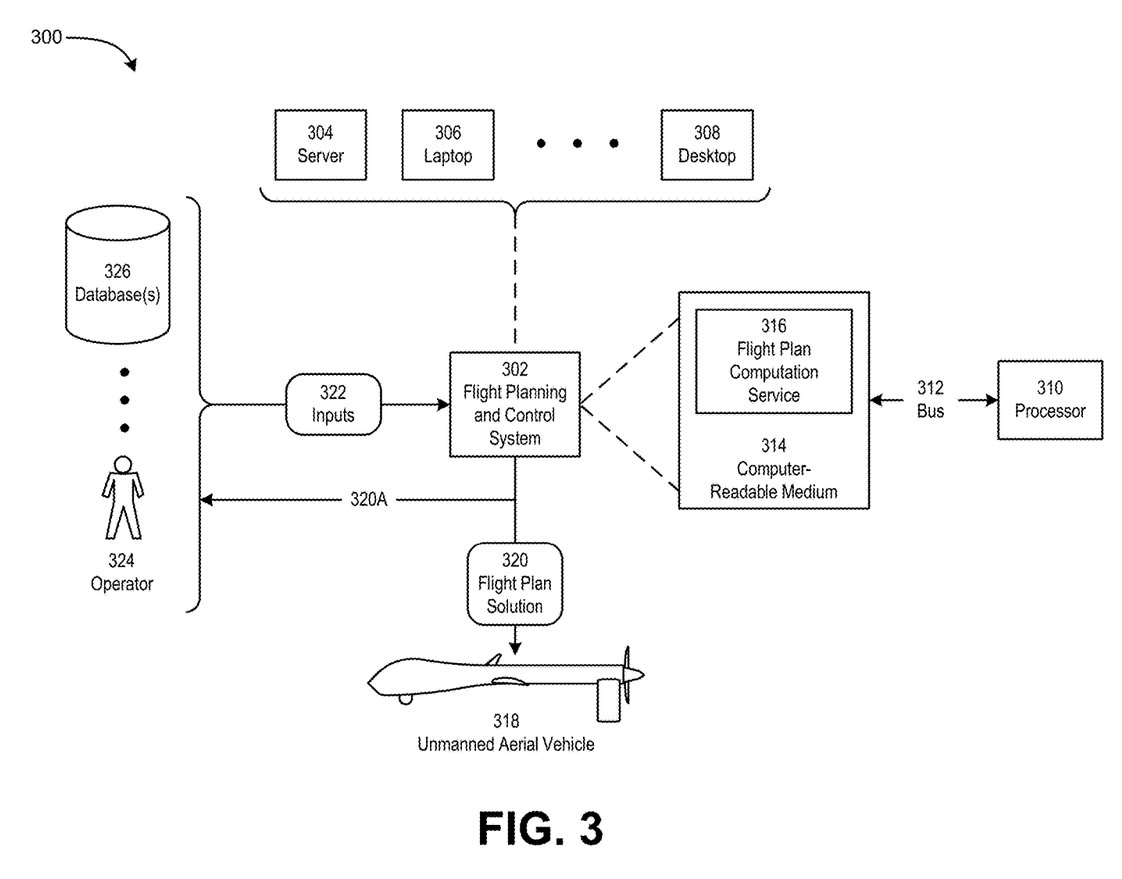
FIG. 3 depicts a block diagram illustrating systems or operating environments for controlling unmanned aerial vehicles (UAVs).

FIG. 3 illustrates systems or operating environments, denoted generally at 300, that provide flight plans for UAVs while routing around obstacles having spatial and temporal dimensions. These systems 300 may include one or more flight planning and control systems 302. FIG. 3 illustrates several examples of platforms that may host flight planning and control system 302. These examples may include one or more server-based systems 304, one or more portable computing systems 306 (whether characterized as a laptop, notebook, tablet, or other type of mobile computing system), and/or one or more desktop computing systems 308. Flight planning and control system 302 may be a ground-based system that performs pre-flight planning and route analysis for a UAV or a vehicle-based system that is housed within a UAV.

Implementations of this description may include other types of platforms as well, with FIG. 3 providing some non-limiting examples. For example, the description herein contemplates other platforms for implementing the flight planning systems, including, but not limited to, wireless personal digital assistants, smartphones, or the like. The graphical elements used in FIG. 3 to depict various components are chosen only to facilitate illustration and not to limit possible implementations of the description herein.

Turning to flight planning and control system 302 in more detail, it may include one or more processors 310 that each may have a particular type or architecture that may be chosen based on an intended implementation. Processors 310 may couple to one or more bus systems 312 that are chosen for compatibility with processors 310.

The flight planning and control systems 302 may include one or more instances of computer-readable storage media 314 that couple to the bus systems 312. Bus systems 312 may enable processors 310 to read code and/or data to/from the computer-readable storage media 314. Storage media 314 may represent storage elements implemented using any suitable technology, including, but not limited to, semiconductors, magnetic materials, optics, or the like. Storage media 314 may include memory components, whether classified as RAM, ROM, flash, or other types, and may also represent hard disk drives.

Storage media 314 may include one or more modules 316 of instructions that, when loaded into one or more of processors 310 and executed, cause flight planning and control system 302 to provide flight plan computation services for one or more UAVs 318. These modules may implement the various algorithms and models described and illustrated herein.

UAVs 318 may be of any size and/or type and may be designed for different applications. In different scenarios, the UAVs may range from relatively small drones to relatively large transport aircraft. Accordingly, the graphical illustration of UAV 318 as shown in FIG. 3 is representative only, and is not drawn to scale.

Flight plan computation services provided by one or more of modules 316 may generate respective flight plan solutions 320 for UAV 318 based on inputs 322, with operator 324 and/or one or more databases 326 providing inputs 322. In this disclosure, flight planning computation services include flight control and monitoring and any other services that may be provided to allow operator 324 to control, monitor, and otherwise operate a UAV such as UAV 318.

Assuming that the flight plan services 316 define one or more solutions 320, flight planning and control system 302 may load the solutions into UAV 318, as represented by the arrow connecting block 320 and UAV 318 in FIG. 3. In addition, flight planning and control system 302 may also provide solutions 320 to operator 324 and/or databases 326, as denoted by the arrow 320A. Flight plan solutions 320 may include any control commands, requests for data, instructions, and any other data or commands that operator 324 may convey or otherwise transmit to UAV 318 via flight planning and control system 302.

Figure 4:
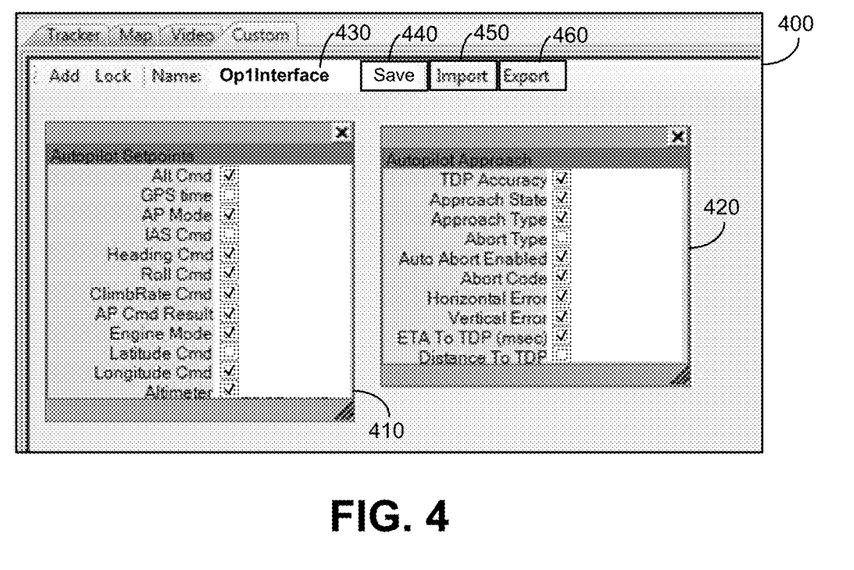
FIG. 4 depicts an illustration of an example user interface according to one example of the disclosed subject matter.

Flight planning and control system 302 may provide a user interface for operator 324 to use in control and monitoring of UAV 318. In an example, such a user interface may be customizable by individual users so that each user may develop an interface that works best for that respective user. FIG. 4 illustrates user interface 400 that may allow a UAV operator to select fields and other data to be presented in a user interface that the operator may use to control and monitor a UAV. User interface 400 may include one or more sections that each list display elements that are related in some manner. For example, section 410 of user interface 400 lists display elements related to autopilot set points, while section 420 of user interface 400 lists display elements related to autopilot approach. Any number and type of sections related to any attributes, characteristics, or operational areas may be displayed on user interface 400, and each such sections may present any number and type of display elements. All such examples are contemplated as within the scope of the present disclosure.

Each of sections 410 and 420 may allow a user to select particular elements to be displayed in a user interface used to control and monitor a UAV. In one example, all possible display elements may be listed for a particular section, and check boxes or other user-selectable controls may be presented allowing the operator to select those display elements that the user would like to have presented when operating a UAV.

Once a selection of display elements is made, an operator may save the display configuration data for future use. Name text box 430 may provide the operator with an interface in which a name for a particular display configuration may be entered. By allowing the naming and saving of multiple display configurations, an operator may use the display configuration that is most suitable for the UAV tasks at hand. Upon completing a selection of display elements and entering a name for the display configuration, an operator may save the display configuration data by selecting save button 440. Note that an operator may also select or otherwise indicate other types of display preferences. For example, a user may move sections 410 and 420 about within user interface 400, and the position and/or location of sections 410 and 420 may be saved as display configuration data. Any other attributes may be selected or configured by an operator and saved in a display configuration data file, including color, text characteristics (e.g., color, font, size, etc.), background, etc. All such configurations are contemplated as within the scope of the present disclosure.

An operator may also import settings from another display configuration by selecting import button 450, which may allow the operator to select and load a display configuration data file which will populate the display element selections in each of sections 410 and 420, and any other sections that may be in use. After the operator has made any changes, if desired, the modified display configuration may be saved as well. The operator may also generate a display configuration data file including the currently selected display elements by selecting export button 460. Such a file may be used with another flight planning and control system or other user interface.

Figure 5:
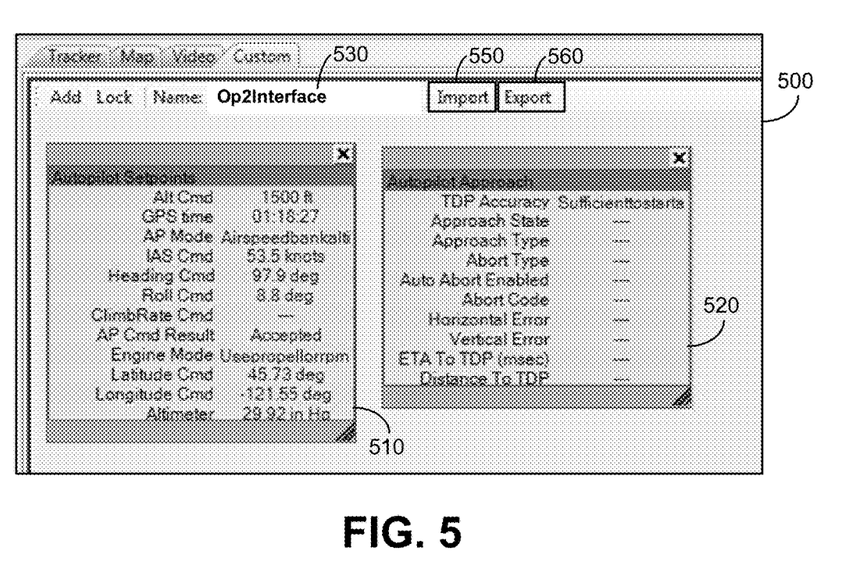
FIG. 5 depicts an illustration of another example user interface according to one example of the disclosed subject matter.

FIG. 5 illustrates example user interface 500 that may be used in controlling, monitoring, and otherwise operating a UAV. User interface 500 displayed according to a display configuration having the name indicated in name text box 530 and that may have been created as described above in regard to FIG. 4. User interface 500 shows section 510 displaying elements related to autopilot set points and section 520 displaying elements related to autopilot approach. Any number and type of sections related to any attributes, characteristics, or operational areas may be displayed on user interface 500, and each such sections may present any number and type of display elements. All such examples are contemplated as within the scope of the present disclosure.

User interface 500 may allow an operator to import settings from another display configuration by selecting import button 550, which may allow the operator to select and load a display configuration data file which will populate sections 510 and 520, and any other sections that may be in use, with display elements according to the selected display configuration data file. The operator may also export the current display configuration being used by generating a display configuration data file including indicators of the currently displayed elements by selecting export button 560. Such a file may be used with another flight planning and control system or other user interface.

Figure 6:
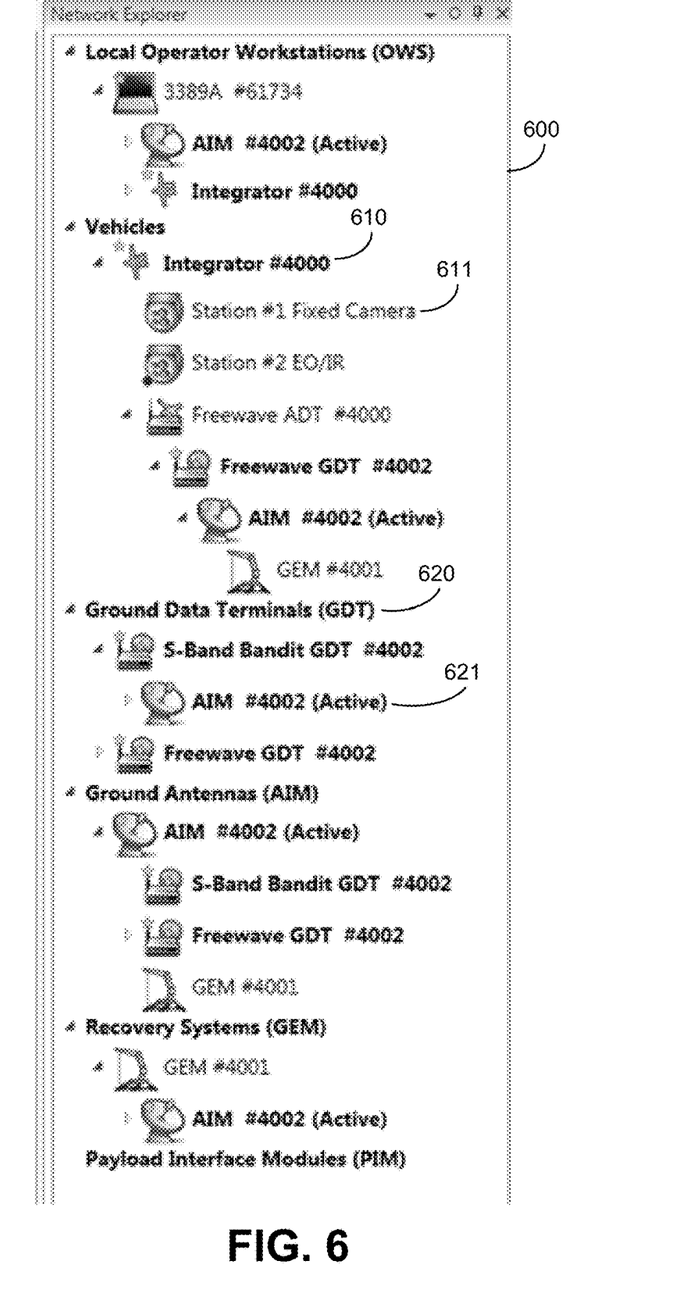
FIG. 6 depicts an illustration of an example tree structure according to one example of the disclosed subject matter.

To further facilitate ease of operation of a UAV, in an example the relationships between various components of a UAV and the systems and devices with which it interacts may be presented as a hierarchical tree structure. UAV operation involves many different entities, which may include one or more UAVs, each component onboard each UAV, ground-based systems that interact, directly or indirectly, in some manner with one or more UAVs, and user operated systems that allow operators to interact with a UAV. FIG. 6 illustrates structure 600 that shows the relationship of the various entities involved in UAV operation in a manner that is easy to quickly comprehend. Each entity may be represented by a unique identifier. Icons and other non-text visual representations of each entity may also accompany the entity descriptions in structure 600 to further aid in the ease of identification of such entities. For example, a particular icon may be presented that represents a type of entity (e.g., an icon for a workstation, a UAV, a ground data terminal, a ground antenna, a recovery system, a payload interface module, etc.) may be presented proximate to the unique identifier for that entity. Each of the elements shown in structure 600 may also be user selectable. Upon selection of an element, a window or other interface may be generated showing detailed information about the selected element and in some examples providing one or more controls that may allow an operator to control or otherwise affect the selected element.

The tree structure allows an operator to easily view the relationship of each entity. For example, due to the visual representation of the relationship in structure 600, an operator can readily understand that camera entity 611 is a camera on or under the control of vehicle 610. Similarly, an operator will be able to easily determine from structure 500 that antenna 621 is controlled or operated by terminal 620. In one example, the hierarchy displayed in structure 600 may conform to the NATO Standardization Agreement 4586 (STANAG 4586) hierarchy In some examples of the present disclosure, the user interface presented to an operator may be further enhanced to facilitate the operation of a UAV. In one example, the user interface presented to an operator may integrate drag and drop functionality, window and panel movement and resizing, etc. Portions of user interfaces, such as windows or panels, may be dockable (e.g., will "stick" to one or more sides of a displayed interface). Windows or panels of a user interface may also be organized as tabs, where the user may select a tab to present the selected window or panel while still having access to other tabs associated with other, possibly currently hidden, windows or panels. This will allows several user interface portions to be easily accessible within a single interface. For example, operators may typically work with mapping interfaces but may need to operate multiple UAVs at once, and therefore may be able to more easily operate such interfaces by selecting tabs, panels, or windows representing controls of a particular UAV. Other personnel, such as commanders and field operators may have more interest in tracker functionality (e.g., UAV camera control) or video functionality (e.g., UAV camera control), and therefore may be able to more easily obtain and use such functionality by selecting tabs, panels, or windows representing that particular functionality. The instant subject matter allows such users can more quickly focus on a particular aircraft or function.

Figure 7:
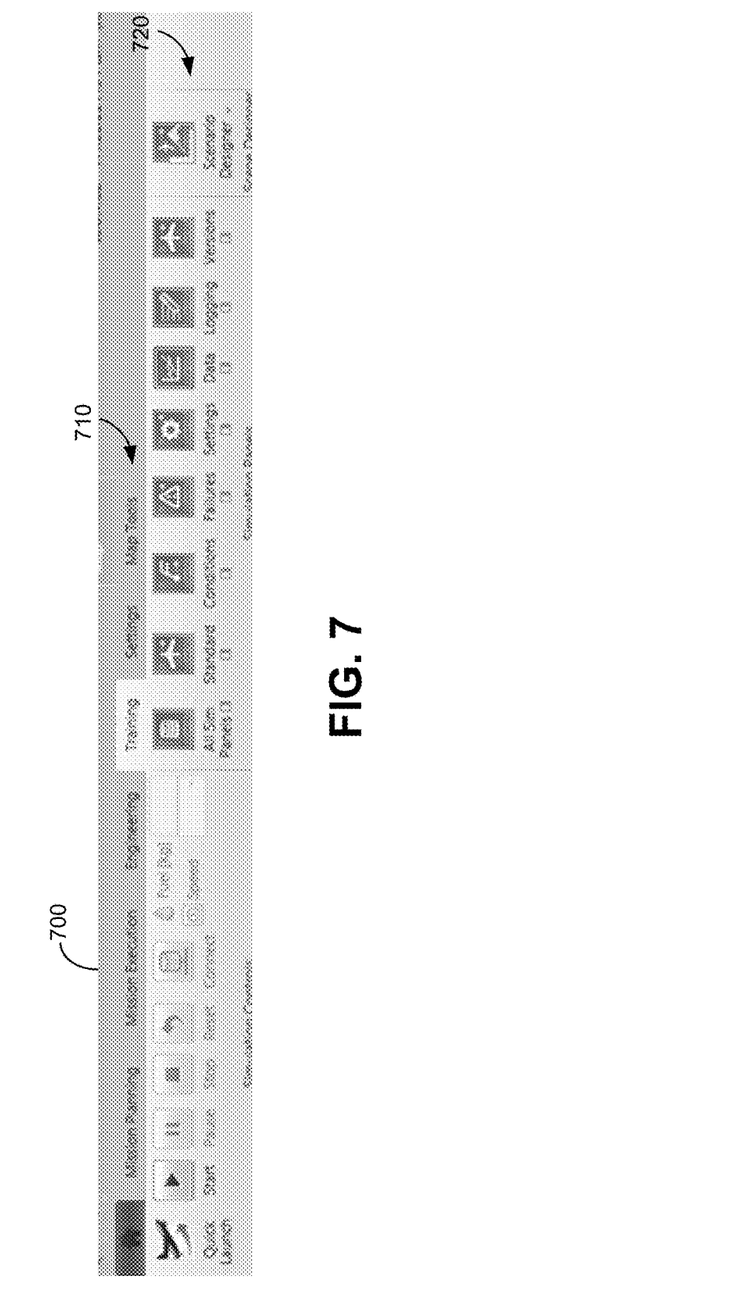
FIG. 7 depicts an illustration of another example user interface according to one example of the disclosed subject matter.

As will be appreciated, the options available and/or desired for each function of UAV operation may vary. Therefore, in another example, menu options presented to an operator may be changed based on the function selected by the operator. For example, FIG. 7 shows section of user interface 700 that includes function selection section 710 and options section 720. Upon an operator selecting a particular function from function selection section 710, such as "Training", the options presented in options section 720 may be automatically changed options that are relevant to the selected function. Any type and number of options may be used for each of any type any number of functions and all such implementations are contemplated as within the scope of the present disclosure.

Figure 8:
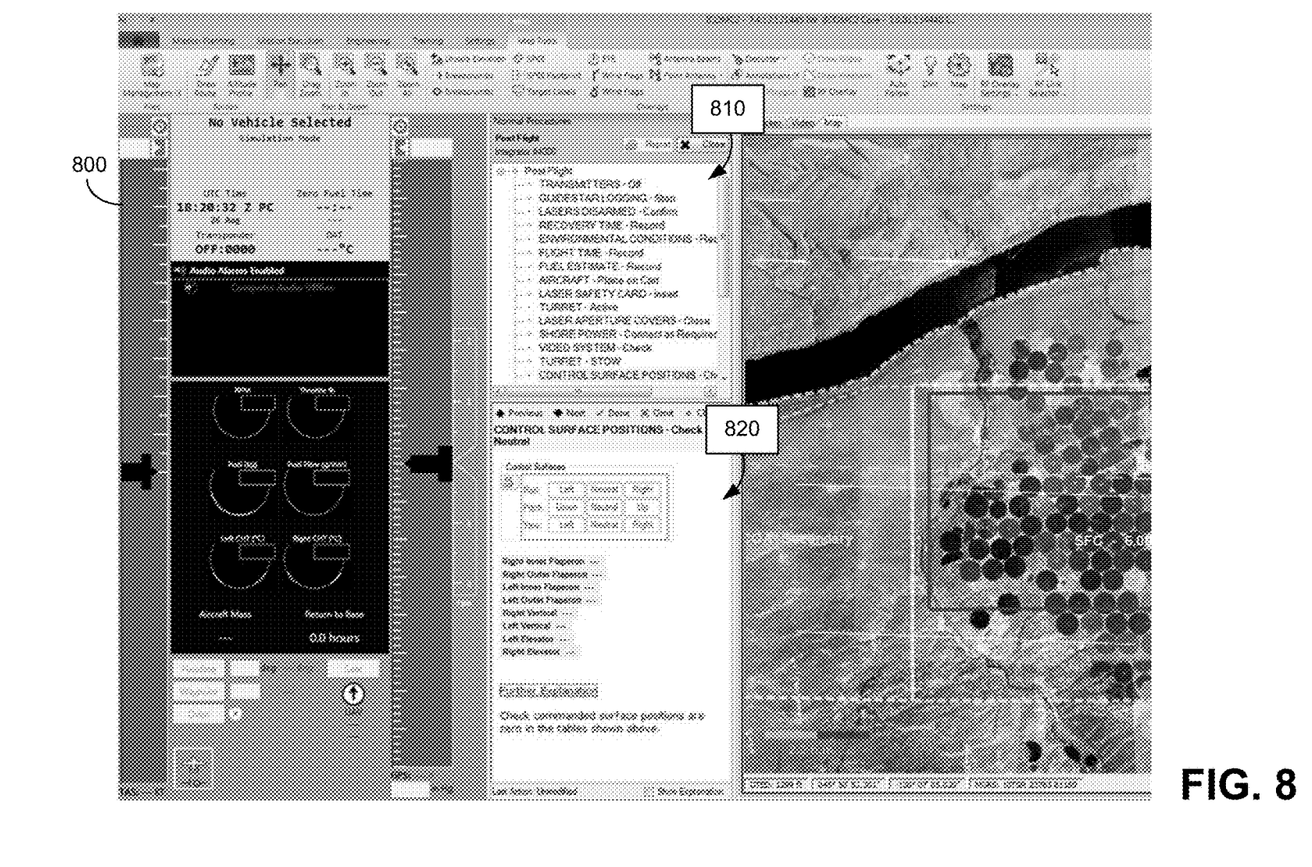
FIG. 8 depicts an illustration of another example user interface according to one example of the disclosed subject matter.

In an example, an operator may be presented in a user interface with checklists that provide a simplified way of stepping through procedures that are typically performed in a similar manner. For example, a method of controlling a UAV may include generating an electronic checklist comprising a plurality of steps, detecting a user selection of a step from among the plurality of steps, and presenting information associated with the step. Such checklists may be generated and provided by a flight planning and control system. Such checklists may be initiated or selected using any means, including selection from options presented with a function selection as described above, selection from a menu, automatically presented based on a trigger, etc. For example, user interface 800 of FIG. 8 illustrates an example of an electronic checklist integrated into a user interface. Checklist 810 may list steps that are to be performed for a particular activity. Each step may be checked off by an operator as performed, or may be automatically updated based on data received by the flight planning and control system as functions are performed.

Further detailed information about each step in checklist 810 may be provided when an operator selects a particular step. For example, in user interface 800, the "CONTROL SURFACE POSITIONS" step is selected from checklist 810, and in response, detailed information and controls regarding this step are presented in section 820 of user interface 800. Section 820 may include any additional details about a selected step, controls that may affect one or more devices or components of a UAV or other equipment, controls that activate a macro that will perform one or more tasks, and controls for obtaining additional information about any part of the step. The data associated with a checklist step may be customized and altered as needed. Such data may include instructions to an operator about particular conditions and situations to be aware of, steps to be taken manually, etc.

Figure 9:
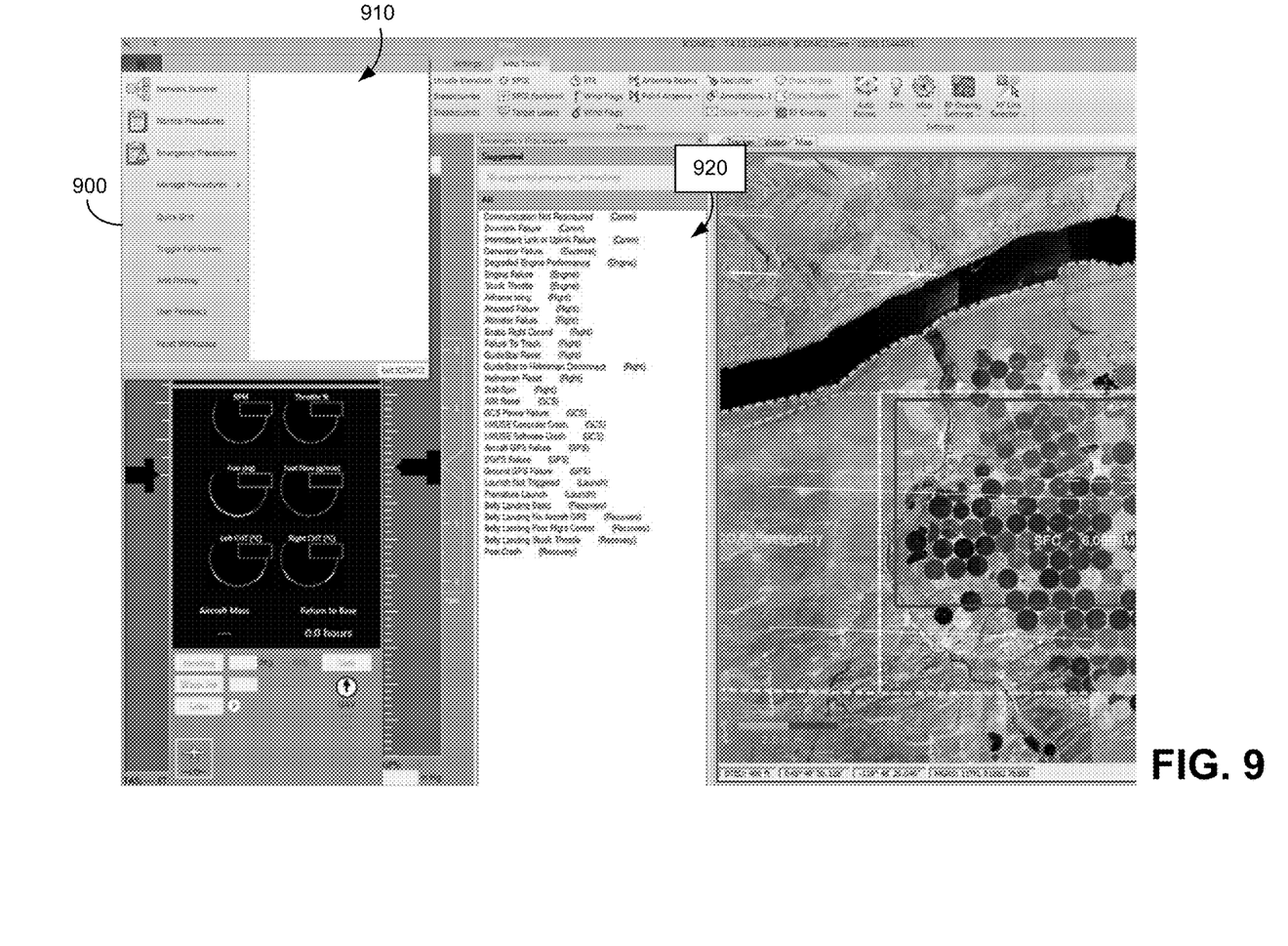
FIG. 9 depicts an illustration of another example user interface according to one example of the disclosed subject matter.

In another example, an operator may be presented in a user interface with emergency checklists that provide a simplified way of addressing emergencies by presenting the operator with a checklist that steps the operator through procedures that may be performed in particular emergencies. Such checklists may be initiated or selected using any means, including selection from options presented with a function selection as described above, selection from a menu, automatically presented based on a trigger, etc. For example, user interface 900 of FIG. 9 illustrates an example of a selection of a particular emergency checklist. An operator may request a listing of emergency check lists from menu 910, resulting in the presentation of listing of emergency checklists 920. Listing of checklists 920 may include checklists associated with particular types of emergencies and may also include suggested checklists that may be determined by a system based on data received regarding a UAV.

Figure 10:
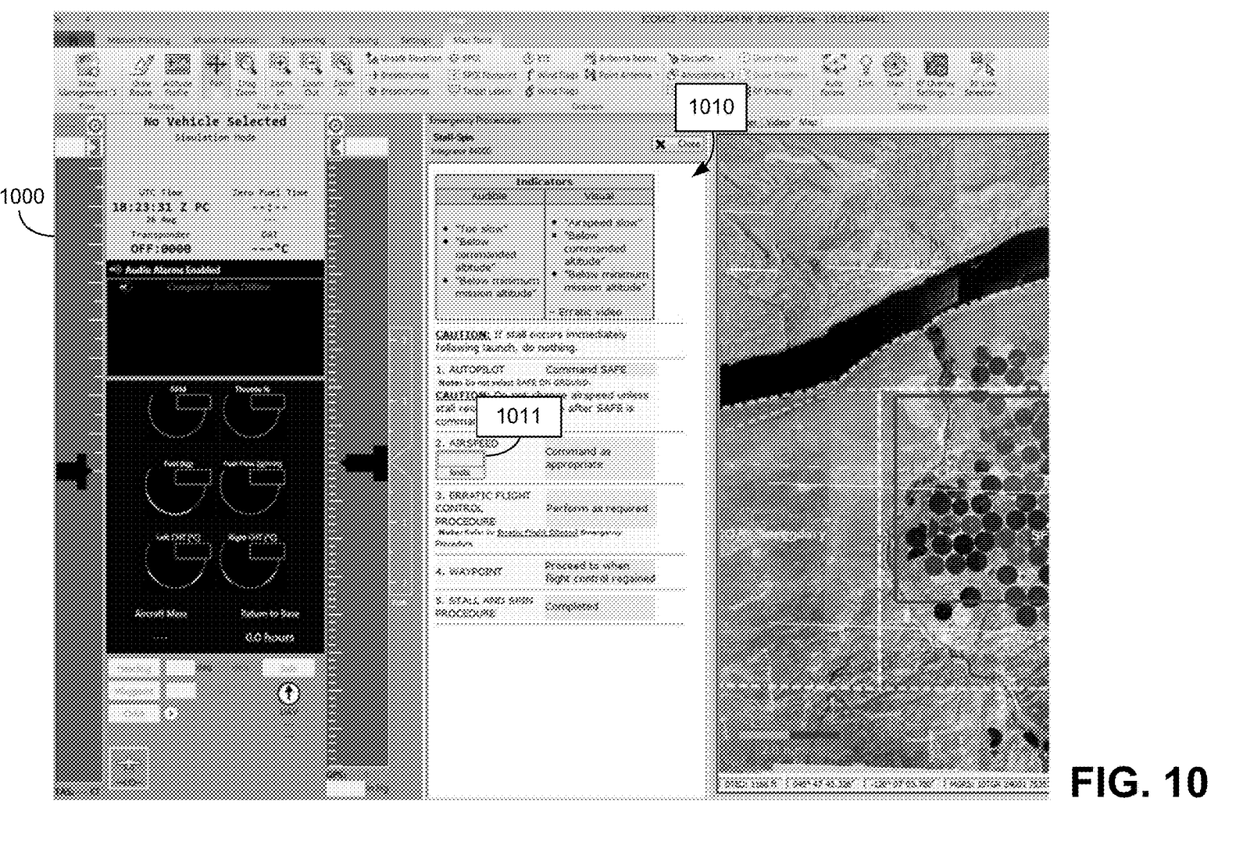
FIG. 10 depicts an illustration of another example user interface according to one example of the disclosed subject matter.

Upon selection of an emergency checklist, as shown in FIG. 10 illustrating user interface 1000, emergency procedures 1010 may be presented to an operator. Emergency procedures 1010 may include steps that an operator may take to address the emergency associated with the selected checklist. Emergency procedures 1010 may include additional details about a selected step, controls that may affect one or more devices or components of a UAV or other equipment, controls that activate a macro that will perform one or more tasks, and controls for obtaining additional information about any part of the step. Emergency procedures 1010 may also include user input box 1011 that allows the operator to provide data about the emergency or devices and UAVs involved in the emergency to a flight planning and control system to allow the system to update the presented steps based on the supplied data so that the steps can be made more specific to the ongoing emergency. As will be appreciated this may allow an operator to more efficiently and effectively address the emergency. Emergency procedures 1010 may include a control allowing an operator to indicate that a step is complete. In response, a flight planning and control system may then automatically present the next step to the operator.

Figure 11:
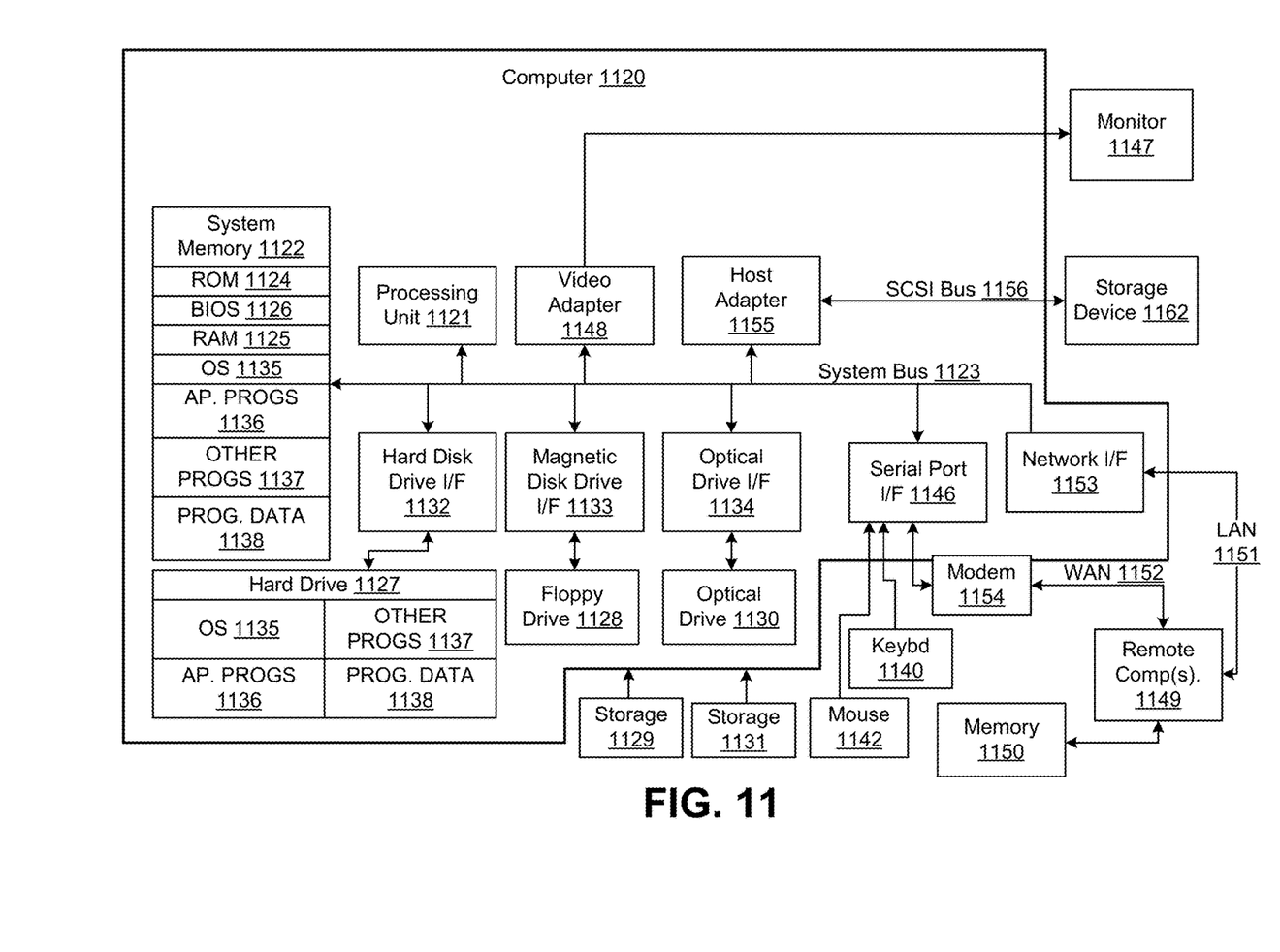
FIG. 11 depicts an illustration of an example computing environment in which operations according to the disclosed subject matter may be performed.

FIG. 11 and the following discussion are intended to provide a brief general description of a suitable computing environment in which the methods and systems disclosed herein and/or portions thereof may be implemented. For example, the functions of server 304, laptop 306, desktop 308, flight planning and control system 302, and database 326 may be performed by one or more devices that include some or all of the aspects described in regard to FIG. 11. Some or all of the devices described in FIG. 11 that may be used to perform functions of the claimed examples may be configured in other devices and systems such as those described herein. Alternatively, some or all of the devices described in FIG. 11 may be included in any device, combination of devices, or any system that performs any aspect of a disclosed example.

Although not required, the methods and systems disclosed herein may be described in the general context of computer-executable instructions, such as program modules, being executed by a computer, such as a client workstation, server or personal computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the methods and systems disclosed herein and/or portions thereof may be practiced with other computer system configurations, including handheld devices, multi-processor systems, microprocessor-based or programmable consumer electronics, network PCs, minicomputers, mainframe computers and the like. The methods and systems disclosed herein may also be practiced in distributed computing environments where tasks are performed by remote processing devices that are linked through a communications network. In a distributed computing environment, program modules may be located in both local and remote memory storage devices.

FIG. 11 is a block diagram representing a general purpose computer system in which aspects of the methods and systems disclosed herein and/or portions thereof may be incorporated. As shown, the exemplary general purpose computing system includes computer 1120 or the like, including processing unit 1121, system memory 1122, and system bus 1123 that couples various system components including the system memory to processing unit 1121. System bus 1123 may be any of several types of bus structures including a memory bus or memory controller, a peripheral bus, and a local bus using any of a variety of bus architectures. The system memory may include read-only memory (ROM) 1124 and random access memory (RAM) 1125. Basic input/output system 1126 (BIOS), which may contain the basic routines that help to transfer information between elements within computer 1120, such as during start-up, may be stored in ROM 1124.

Computer 1120 may further include hard disk drive 1127 for reading from and writing to a hard disk (not shown), magnetic disk drive 1128 for reading from or writing to removable magnetic disk 1129, and/or optical disk drive 1130 for reading from or writing to removable optical disk 1131 such as a CD-ROM or other optical media. Hard disk drive 1127, magnetic disk drive 1128, and optical disk drive 1130 may be connected to system bus 1123 by hard disk drive interface 1132, magnetic disk drive interface 1133, and optical drive interface 1134, respectively. The drives and their associated computer-readable media provide non-volatile storage of computer-readable instructions, data structures, program modules and other data for computer 1120.

Although the example environment described herein employs a hard disk, removable magnetic disk 1129, and removable optical disk 1131, it should be appreciated that other types of computer-readable media that can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 1127, magnetic disk 1129, optical disk 1131, ROM 1124, and/or RAM 1125, including an operating system 1135, one or more application programs 1136, other program modules 1137 and program data 1138. A user may enter commands and information into the computer 1120 through input devices such as a keyboard 1140 and pointing device 1142. Other input devices (not shown) may include a microphone, joystick, game pad, satellite disk, scanner, or the like. These and other input devices are often connected to the processing unit 1121 through a serial port interface 1146 that is coupled to the system bus, but may be connected by other interfaces, such as a parallel port, game port, or universal serial bus (USB). A monitor 1147 or other type of display device may also be connected to the system bus 1123 via an interface, such as a video adapter 448. In addition to the monitor 1147, a computer may include other peripheral output devices (not shown), such as speakers and printers. The exemplary system of FIG. 11 may also include host adapter 1155, Small Computer System Interface (SCSI) bus 1156, and external storage device 1162 that may be connected to the SCSI bus 1156.

The computer 1120 may operate in a networked environment using logical and/or physical connections to one or more remote computers or devices, such as remote computer 1149, that may represent any of server 304, laptop 306, desktop 308, flight planning and control system 302, and database 326. Each of server 304, laptop 306, desktop 308, flight planning and control system 302, and database 326 may be any device as described herein capable of generating or otherwise interacting with user interfaces used to control, monitor, or otherwise operate a UAV. Remote computer 1149 may be a personal computer, a server, a router, a network PC, a peer device or other common network node, and may include many or all of the elements described above relative to the computer 1120, although only a memory storage device 1150 has been illustrated in FIG. 11. The logical connections depicted in FIG. 11 may include local area network (LAN) 1151 and wide area network (WAN) 1152. Such networking environments are commonplace in police and military facilities, offices, enterprise-wide computer networks, intranets, and the Internet.

When used in a LAN networking environment, computer 1120 may be connected to LAN 1151 through network interface or adapter 1153. When used in a WAN networking environment, computer 1120 may include modem 1154 or other means for establishing communications over wide area network 1152, such as the Internet. Modem 1154, which may be internal or external, may be connected to system bus 1123 via serial port interface 1146. In a networked environment, program modules depicted relative to computer 1120, or portions thereof, may be stored in a remote memory storage device. It will be appreciated that the network connections shown are exemplary and other means of establishing a communications link between computers may be used.

Computer 1120 may include a variety of computer-readable storage media. Computer-readable storage media can be any available tangible, non-transitory, or non-propagating media that can be accessed by computer 1120 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium that can be used to store the desired information and that can be accessed by computer 1120. Combinations of any of the above should also be included within the scope of computer-readable media that may be used to store source code for implementing the methods and systems described herein. Any combination of the features or elements disclosed herein may be used in one or more examples.

This written description uses examples to disclose the subject matter contained herein, including the best mode, and also to enable any person skilled in the art to practice the invention, including making and using any devices or systems and performing any incorporated methods. The patentable scope of this disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of controlling an unmanned aerial vehicle, comprising:

determining a plurality of electronic checklists based on unmanned aerial vehicle data;

generating a menu comprising menu items associated with each of the plurality of electronic checklists;

rendering, on a user interface configured to represent controls for the unmanned aerial vehicle, an electronic checklist comprising a plurality of steps for controlling the unmanned aerial vehicle, wherein the rendering comprises generating the electronic checklist in response to a user selection of a menu item associated with the electronic checklist from among the menu items;

detecting, by the user interface, one or more of a user selection of a step from among the plurality of steps, display preferences, or rearrangement of the plurality of steps;

presenting, on the user interface, information associated with the user selection, wherein the information comprises a control that, when activated, manipulates a component configured on the unmanned aerial vehicle; and saving the user selection as a display configuration data file for subsequent retrieval to recreate an associated display configuration.

2. The method of claim 1, wherein the information further comprises:

a user input that accepts user provided data and provides the user provided data to a flight planning and control system.

3. The method of claim 2, wherein the user provided data is used to update the plurality of steps.

4. The method of claim 2, wherein the information further comprises:

a control that, when activated, indicates to a flight planning and control system that the user selected step is complete.

5. The method of claim 1, wherein the information further comprises:

a control that activates a macro that will perform one or more tasks.

6. The method of claim 1, wherein the information further comprises a control for obtaining additional information about the user selected step.

7. The method of claim 1, further comprising, in response to detecting that the user selected step is complete, presenting information associated with a subsequent step.

8. A flight planning and control system for controlling an unmanned aerial vehicle, comprising:
- a memory comprising instructions; and
- a processor coupled to the memory that, when executing the instructions, effectuates operations comprising:
- determining a plurality of electronic checklists based on unmanned aerial vehicle data;
- generating a menu comprising menu items associated with each of the plurality of electronic checklists;
- rendering, on a user interface configured to represent controls for the unmanned aerial vehicle, an electronic checklist comprising a plurality of steps for controlling the unmanned aerial vehicle, wherein the rendering comprises generating the electronic checklist in response to a user selection of a menu item associated with the electronic checklist from among the menu items;
- detecting, by the user interface, one or more of a user selection of a step from among the plurality of steps, display preferences, or rearrangement of the plurality of steps; presenting, on the user interface, information associated with the user selection, wherein the information comprises a control that, when activated, manipulates a component configured on the unmanned aerial vehicle; and
- saving the user selection as a display configuration data file for subsequent retrieval to recreate an associated display configuration.

9. The flight planning and control system of claim 8, wherein the information further comprises:
- a user input that accepts user provided data and provides the user provided data to the flight planning and control system.

10. The flight planning and control system of claim 9, wherein the user provided data is used to update the plurality of steps.

11. The flight planning and control system of claim 9, wherein the information further comprises:
- a control that, when activated, indicates to a flight planning and control system that the user selected step is complete.

12. The flight planning and control system of claim 8, wherein the information further comprises:
- a control that activates a macro that will perform one or more tasks.

13. The flight planning and control system of claim 8, wherein the information further comprises a control for obtaining additional information about the user selected step.

14. The flight planning and control system of claim 8, wherein the operations further comprise, in response to detecting that the user selected step is complete, presenting information associated with a subsequent step.

15. A non-transitory computer-readable storage medium comprising computer executable instructions that, when executed by a processor, effectuate operations to control an unmanned aerial vehicle, the instructions comprising:
- determining a plurality of electronic checklists based on unmanned aerial vehicle data;
- generating a menu comprising menu items associated with each of the plurality of electronic checklists;
- rendering, on a user interface configured to represent controls for the unmanned aerial vehicle, an electronic checklist comprising a plurality of steps for controlling the unmanned aerial vehicle, wherein the rendering comprises generating the electronic checklist in response to a user selection of a menu item associated with the electronic checklist from among the menu items;
- detecting, by the user interface, one or more of a user selection of a step from among the plurality of steps, display preferences, or rearrangement of the plurality of steps;
- presenting, on the user interface, information associated with the user selection, wherein the information comprises a control that, when activated, manipulates a component configured on the unmanned aerial vehicle; and
- saving the user selection as a display configuration data file for subsequent retrieval to recreate an associated display configuration.

16. The non-transitory computer-readable storage medium of claim 15, wherein the information further comprises a user input that accepts user provided data and provides the user provided data to a flight planning and control system.

17. The non-transitory computer-readable storage medium of claim 15, wherein user provided data is used to update the plurality of steps.

18. The non-transitory computer-readable storage medium of claim 16, wherein the information further comprises a control that, when activated, indicates to a flight planning and control system that the user selected step is complete.

19. The non-transitory computer-readable storage medium of claim 15, wherein the information further comprises:
- a control that activates a macro that will perform one or more tasks.

20. The non-transitory computer-readable storage medium of claim 15, wherein the information further comprises a control for obtaining additional information about the user selected step.

* * * * *